Haviland & Tuttle,
Water Wheel,

Nº 4,536. Patented May 28, 1846.

UNITED STATES PATENT OFFICE.

FREDERICK P. HAVILAND, OF WATERVILLE, AND EBENEZER TUTTLE, OF CANAAN, MAINE.

IMPROVEMENT IN WATER-WHEELS.

Specification forming part of Letters Patent No. 4,536, dated May 28, 1846.

*To all whom it may concern:*

Be it known that we, FREDERICK P. HAVILAND, of Waterville, in the county of Kennebec, and EBENEZER TUTTLE, of Canaan, in the county of Somerset, and both in the State of Maine, have invented a new and useful Water-Wheel, to be used for driving machinery or any mill-work, and to be used where there may be a fall of water, whether said fall of water is occasioned by the rising and falling of the tide or otherwise, of which the following is a specification.

There is attached to said wheel a register or registering-gate to be used to regulate the venting of water at pleasure without raising or depressing the flume-gate, as is now done in mills almost universally. We also relieve the wheel from the weight of water which may be above it, having at the same time a full supply of water on the entire circumference to operate, as we believe, with the greatest effect on every bucket.

The buckets of our wheel we so construct as to present a straight surface to the water on the outer circle and on the inner circle a smooth surface, so as to prevent a retarding influence when immersed in water.

We will now give in detail the manner of constructing the wheel as set forth above, reference being had to the annexed drawings, which make a part of this specification.

Figure 1:
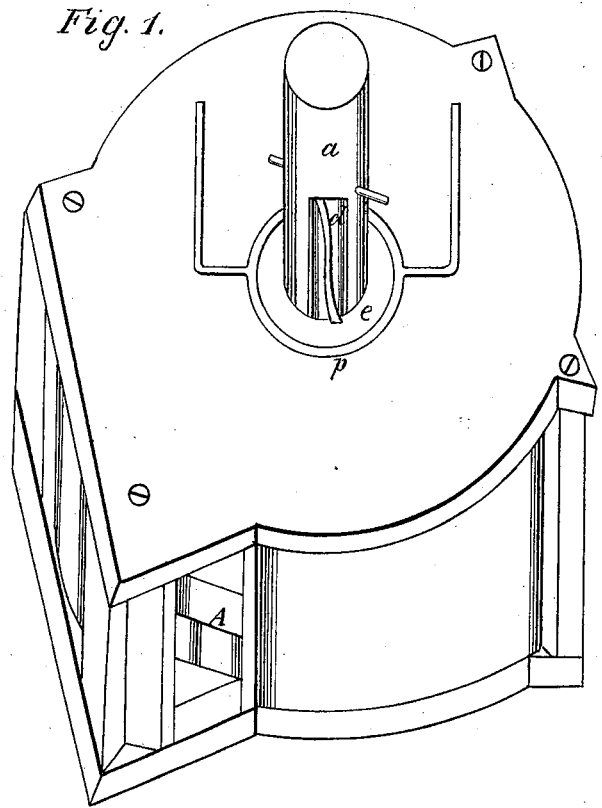
Figure 3:
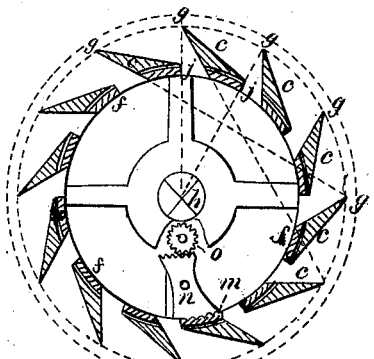
Figure 2:
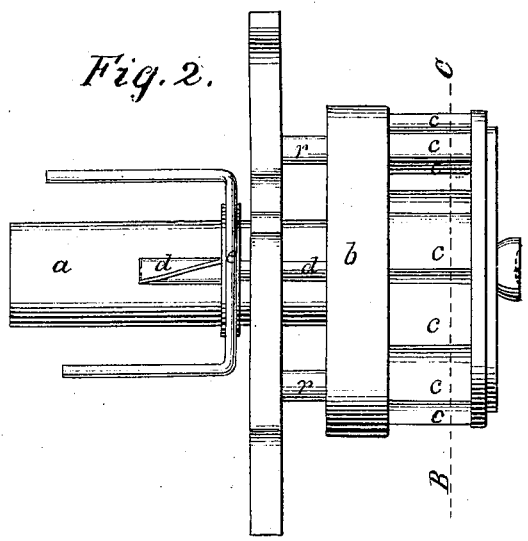

Figure 1 is a perspective view of the wheel-box, which contains the wheel, A being the aperture through which the water is received onto the wheel. Fig. 2 is a longitudinal elevation of the wheel when separated from the wheel-box, $a$ being the main shaft, $b$ the cap or plate which relieves the wheel from the pressure of water, $c\ c$ the buckets, $d$ the shaft attached to the regulator or registering-gate, and $e$ a chuck which operates the registering-gate. Fig. 3 is a section on B C of Fig. 2, showing the form of bucket $c\ c$, the registering-gate $f$, and the manner of connecting the shaft $d$, Fig. 2, by cog-gear to the registering-gate $f$.

In constructing this wheel with our straight bucket we first determine the circumference of the wheel and the number of buckets and divide the circumference into that number, and, as shown on the drawing Fig. 3 into twelve. From each of these points $g\ g\ g$ we draw a line to the center $h$. Then a line from the points $g\ g$ to the point where the next line $g\ h$ crosses the inner circle of the rim, as at $j$, determines the angle of the bucket exposed to the action of the water. Now a line drawn from $g$ on one bucket to $g$ on the fourth bucket determines the opposite or back side of the bucket and the curve of the rim the third and last side. This form of bucket will give the greatest effect to the water, and the vent, as determined by the lines as described, and shown on the drawings, will be as much as is ever required, and the inner surface being smooth will meet with less resistance than the crooked bucket now used.

Figure 5:
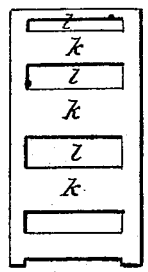

In constructing the registering-gate we cast two rims, between which rims we place the gate, as shown in Fig. 5, $k\ k$ being the gates and $l\ l$ the openings. These openings or spaces must be equal to the vents of the buckets, and the gates equal to the interior side of the bucket, as shown on Fig. 3, so that when the register is open, as on Fig. 3, the wheel will vent as much water as it would without the register being on. This register being thus made and the wheel embraced within the rims above mentioned on the upper rim, as at $m$, Fig. 3, we cast a sufficient number of cogs to occupy the space of one gate and one opening. On Fig. 3, $n$ is a lever with cogs on each end and fastened by a bolt or screw on one arm of the wheel, so that by turning the lever the registering-gate is moved so as to close the vent of the wheel partially or entirely, as required.

Figure 4:
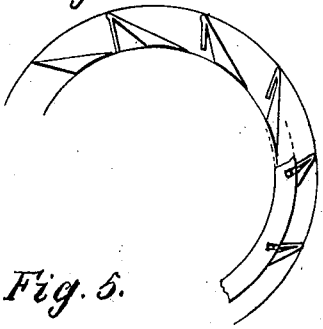
Figure 6:

On Figs. 1, 2, and 5 we let a shaft $d$, Figs. 1 and 2, into the main shaft $a$, having a spiral spine on the upper end, as seen in Figs. 1 and 2, and on the lower end a pinion, as seen at $o$, Fig. 3, this shaft $d$ being made to turn by the chuck, which passes around the main shaft and receives the spine, so that when the chuck rises or falls the registering-gate is opened or closed. The chuck revolves with the main shaft, but being grooved on its outer edge, a ring or clasp is placed around it, as seen at $p$, Fig. 1, which does not revolve, but is used for raising or depressing the chuck. There must be a straight spine on the main shaft to keep the chuck in its place, so that when it is moved it will move on a line with the main shaft. Fig. 4 is another method of closing the vent. We provide the wheel with a rim, as before; but instead of of closing the vent by the gates, as above described, on the outer point of the bucket, we construct a butt-hinge joint, and by a gate which turns on the hinge as a center we close in part or wholly the vent of the bucket. In operating this form of registering-gate we use the same method of the lever, pinion, shaft, chuck, and spiral spine as before described. Fig. 6 is a representation of this gate, and it will be seen that a journal is provided on the upper end, which is received into a slot on the rim, as shown on Fig. 4.

To relieve the wheel of the pressure of water, we construct a cap $b$, Fig. 2, of the same diameter as the wheel, which should shut down over the arms and upper rim of the wheel. This cap is suspended by bolts or rods $r$ from the covering of the wheel-box and is independent of the wheel, and the water filling the space between the cap and covering of the wheel-box the water acts equally on all parts of the wheel without pressing on the lower end of the main shaft.

What we claim as our invention, and desire to secure by Letters Patent, is—

The manner in which we lay out and form the two straight sides of the buckets we use on our improved water-wheel—to wit, the extreme points of the buckets being placed at the distance of thirty degrees or thereabout from each other, their two straight sides meeting at an angle of twenty degrees or thereabout, and their rear sides being at an angle of thirty degrees or thereabout with the radius of the wheel as laid out according to the directions, substantially as herein set forth.

FREDERICK P. HAVILAND.
EBENEZER TUTTLE.

In presence of—
B. F. CHANDLER,
SAMUEL BROWN.